Dec. 28, 1965  R. G. GANTT  3,225,877
CLUTCH AND THE LIKE
Filed Aug. 2, 1962  2 Sheets-Sheet 1

Robert G. Gantt
INVENTOR.

BY
ATTORNEYS

Dec. 28, 1965  R. G. GANTT  3,225,877
CLUTCH AND THE LIKE
Filed Aug. 2, 1962  2 Sheets-Sheet 2
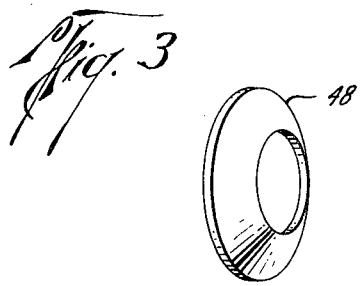
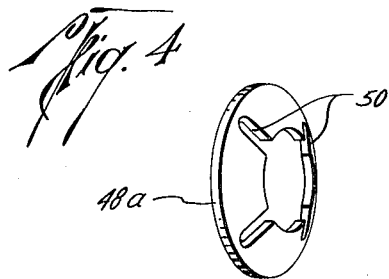
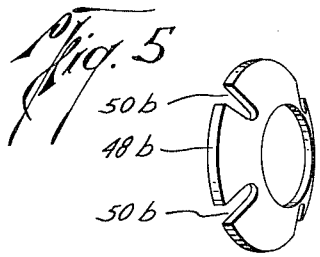
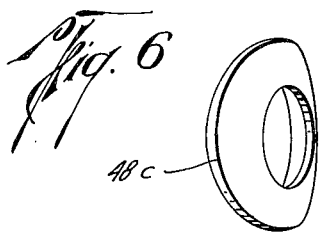
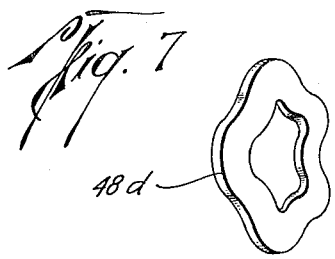
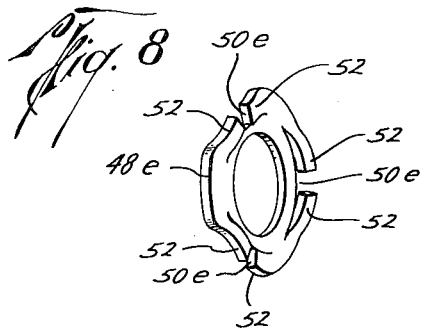
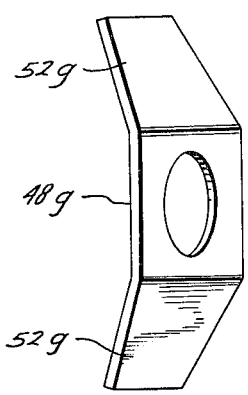
Robert G. Gantt
INVENTOR.
BY
ATTORNEYS 3,225,877
CLUTCH AND THE LIKE
Robert G. Gantt, 6105 England St., Houston, Tex.
Filed Aug. 2, 1962, Ser. No. 214,283
2 Claims. (Cl. 192—76)

The present invention relates to new and useful improvements in clutches, brakes, flexible shaft-couplings, universal joints and the like.

It would be advantageous to provide an assembly which can be used as a driving clutch, brake, flexible-coupling and universal type joint in which expansion and contraction of various parts due to changes in temperature are all automatically compensated for when the parts are in firm frictional engagement. For example, in large marine engines and installations, the use of clutches has been severely limited due to the expansion and contraction of the shafts resulting from rather large temperature differentials. It would therefore be highly advantageous to provide such a clutch assembly, flexible-coupling, brake assembly, universal joint and the like which automatically adjusts itself for expansion and contraction due to temperature changes while engaged and the present invention is directed to such an assembly.

It is therefore an object of the present invention to provide an assembly which automatically adjusts itself for expansion and contraction in the shafts and other components of the clutch assembly due to changes in temperature while the assembly is in engaged position.

Yet a further object of the present invention is the provision of such an assembly which automatically adjusts itself for changes in expansion and contraction resulting from operating temperature changes while in engaged position which is of very simple and economic construction and which is ruggedly efficient in use.

Figure 1:
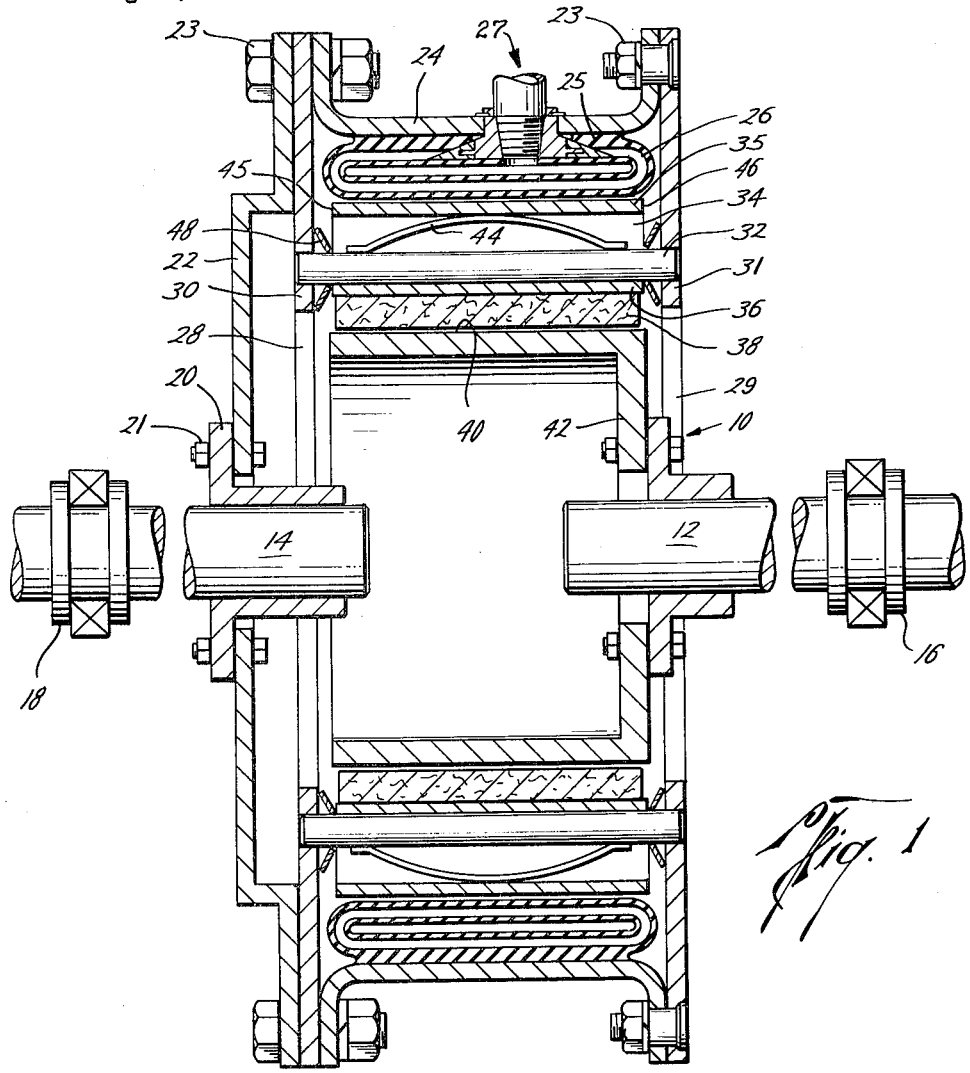
Figure 2:
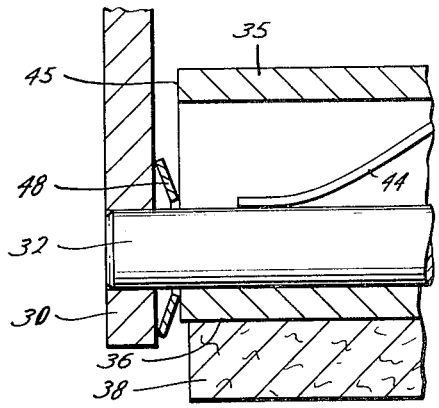

Other and further objects, features and advantages will be apparent from the following description of presently-preferred embodiments of the invention, taken in conjunction with the accompanying drawings, where like character references designate like parts throughout the several views, and where, FIGURE 1 is a side, sectional view illustrating a clutch assembly according to the present invention, FIGURE 2 is an enlarged, fragmentary view, illustrating a yieldable spacer element yieldably spacing a clutch member, FIGURE 3 is a perspective view illustrating the resilient spacing element utilized in FIGURES 1 and 2, FIGURE 4 is a view similar to FIGURE 3 illustrating a modification of the resilient spacing element, FIGURE 5 is a view similar to FIGURES 3 and 4 illustrating a further modified resilient spacing element, FIGURE 6 is a view similar to FIGURES 3–5, illustrating a still further modification, FIGURE 7 is a view similar to FIGURES 3–6 illustrating a still further modification, FIGURE 8 is a view similar to FIGURES 3–7, illustrating a still further modification, FIGURE 9 is a view similar to FIGURES 3–8 illustrating a still further modification, and FIGURE 10 is an enlarged view similar to FIGURES 3–9 illustrating yet a further modification of the resilient spacer element.

Referring now to the drawings, and particularly to FIGURE 1, the driving clutch assembly, generally indicated by the reference numeral 10 provides a driving connection and release thereof of the shafts 12 and 14 which are disposed in axial alignment and rotatably supported by suitable bearing assemblies 16 and 18, respectively. Either the shaft 12 or the shaft 14 may be the driving and the other the driven shaft. In the following description it will be assumed that the shaft 14 is the driving shaft and the shaft 12 is the driven shaft.

The shaft 14 is keyed to the part 20, which is secured by the bolts 21 to the part 22, which in turn is secured as by the bolts 23 to the part 24, the parts 20, 22 and 24 forming, in effect, a flywheel in the usual manner.

Secured, as by vulcanization or by other means, to the inner, annular face 25 of the annular flywheel member 24, is an annular bag 26, preferably of cord-reinforced rubber. An inlet 27 for introduction and discharge of fluid pressure into the bag 26 is provided. Thus, ingress and egress of a suitable fluid from any desired source, not shown, causes radial inwardly expansion and radially outwardly contraction of the flexible annular bag 26 in the usual manner.

Depending from the annular member 24, and also secured by the bolts 23 are a pair of axially-spaced radially inwardly-extending webb-like members 28 and 29, in which are provided inwardly of the bag member 26 a plurality of circumferentially disposed openings 30 and 31 which receive the torque bars or rods 32. The torque bars or rods 32 are disposed at spaced circumferential points in holes 30 and 31 about the webb members 28 and 29.

Movably disposed about each torque rod or bar 32 is a generally hollow, circumferentially-extending segmental shoe or clutch engaging member 34 comprised of an outer annular surface 35 for engagement of the inner surface of the bag 26 and an annular inner surface 36 to which the frictional clutch material 38 is secured. Thus, the various segmental shoes or clutch engaging members 34, when assembled about the torque rods or bars 32, comprise an annularly-extending shoe which is radially movable inwardly and outwardly for engagement of the clutch shoe surfaces 38 with the outer annular clutch or friction surface 40 of the male clutch member.

A plurality of elongated, leaf-like springs 44 are provided which yieldably retain the clutch shoes 34 out of engagement with the clutch or friction surface 40 of the male clutch 42 but are arranged so that application of fluid pressure in the conduit 27 expands the bag 26 radially inward thereby moving the clutch surfaces 38 against the clutch surface 40.

The axial length of the clutch shoes 34 is such that the shoes can move in either direction axially to accommodate movement of the shafts 12 and 14, and other component parts of the clutch assembly, before the ends 45 and 46 engage the inner surfaces of the inwardly extending webb-like wheel members 28 and 29, respectively.

The clutch shoes 34 are yieldingly maintained in a centered position by means of the yieldable, spring-like spacing elements 48 disposed at each end of the shoes 34 and bearing against the inner walls of the inwardly-extending webb-like wheel members 28 and 29.

Thus, the clutch shoes 34 are yieldably maintained in an axially centered position, yet the yieldable spacing elements 48 will yield in either direction so that as the shafts 12 and 14 or other parts become heated or cooled in use, and therefore expand or contract, this expansion and contraction is automatically compensated for by this arrangement.

As illustrated, the resilient spacing elements 48 may generally be in any desired shape, here shown as a washer, and made of any desired material which will withstand the conditions of use. For example, a spring steel washer 48 such as illustrated in FIGURE 3, to which reference is made, may be used.

FIGURE 4–10, inclusive illustrate a variety of shapes of resilient spacing elements which are satisfactory and in which the reference letters "a" through "g" have been added to the reference number 48 to designate these various modifications.

Referring first to FIGURE 4, the resilient spacing element 48a is quite similar to that of FIGURE 3 except that the radially extending slots 50 are provided from the center portion of the washer 48a and through a portion of the body thereof.

In FIGURE 5, a resilient spacing element 48b is illustrated in which the slots 50b extend inwardly from the outer portion of the washer 48b in a radial direction partially through the body thereof.

The embodiment of the resilient spacing element 48c illustrated in FIGURE 6 illustrates a washer similar to that of FIGURE 3 except that it is slightly bent along its diameter to further increase the spacing provided by this particular resilient spacing element.

FIGURE 7, to which reference is now made, illustrates a still further embodiment of the resilient spacing element 48d in which the body surface is nonlinear and has raised and lowered portions to provide the resilient spacing.

Referring now to FIGURE 8, the resilient spacing element 48e is similar to that of FIGURE 7 except that circumferentially extending and circumferentially spaced slots 50e are provided which extend radially outwardly of the body to provide the outwardly projecting resilient projections of 52, which provide the resilient spacing for this embodiment of the spacing element.

Referring now to FIGURE 9, the resilient spacing element 48f is substantially similar to that of FIGURE 8 except that the slots 50f are provided and the ears or projections 52f are raised and all extend in the same circumferential direction to provide the resilient spacing function.

Referring now to FIGURE 10, the embodiment of the resilient spacing element 48g has the outwardly or inwardly extending ears 52g and is not substantially round, the outwardly or inwardly extending projections 52g providing the resilient spacing function.

Thus, the resilient spacing element may take a wide variety of shapes and forms and may be made of a wide variety of materials. It is only necessary that these elements resiliently maintain the clutch shoes 34 in position so that they can move due to dimensional changes caused by expansion and contraction when in engaged position. It is only necessary that the resilient spacing elements 48 be of a material and a strength necessary under the conditions of use, for example, various rubber and other resilient materials may be utilized in various shapes and under suitable conditions if so desired.

While resilient spacing elements 48 are shown on both sides of the clutch shoes 34, if desired, they may be utilized on one side only in the direction of expansion.

While the various embodiments of the invention illustrated have been described as a driving clutch, obviously these principals may be applied and the structure may be utilized for brakes, flexible couplings, universal joints and the like.

The present invention, therefore, is well suited and adapted to attain the objects and ends and has the advantages and features mentioned as well as others inherent therein.

While presently-preferred examples of the invention have been given for the purpose of disclosure, changes in details of construction and arrangement of parts may be made without departing from the spirit of the invention as defined by the scope of the appended claims.

What is claimed is:
1. The combination of two power-transmitting shafts in series and individually journalled at least approximately in axial alignment, two rotary structures mounted upon and constrained to rotate with the shafts respectively and adapted for substantially full-circle frictional engagement with each other, one of the same including a plurality of torque bars circumferentially arranged and radially spaced with the respect to the location of the full circle frictional engagement, a plurality of segmental engaging elements movably disposed on the torque bars for movement into and out of said full circle frictional engagement and movable axially with respect thereto, and yieldable elements operatively bearing against at least one of the sides of the segmental engaging members yieldably permitting axial movement thereof while said engaging members are in firm full circle frictional engagement with the other of the rotary structures as aforesaid.

2. The combination of claim 1 in which the yieldable elements comprise spring-like members disposed about the torque bars.

References Cited by the Examiner

UNITED STATES PATENTS

| 907,189 | 12/1908 | Sims | 188—206 X |
| 2,637,427 | 5/1953 | Kraft | 192—88 |
| 2,870,891 | 1/1959 | Eakin. | |

FOREIGN PATENTS 593,078  10/1947  Great Britain.

DON A. WAITE, *Primary Examiner.*

DAVID J. WILLIAMOWSKY, ROBERT C. RIORDON, *Examiners.*